(12) United States Patent
Terlizzi et al.

(10) Patent No.: US 8,432,102 B2
(45) Date of Patent: Apr. 30, 2013

(54) SYSTEMS AND METHODS FOR MULTI-STATE SWITCH NETWORKS

(75) Inventors: Jeffrey Terlizzi, Sunnyvale, CA (US); Nicholas R. Kalayjian, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 828 days.

(21) Appl. No.: 11/961,836

(22) Filed: Dec. 20, 2007

(65) Prior Publication Data

US 2008/0164825 A1    Jul. 10, 2008

Related U.S. Application Data

(60) Provisional application No. 60/878,852, filed on Jan. 5, 2007, provisional application No. 60/937,853, filed on Jun. 28, 2007.

(51) Int. Cl.
*H05B 37/02* (2006.01)

(52) U.S. Cl.
USPC ...................................... 315/209 R; 315/312

(58) Field of Classification Search .............. 315/185 R, 315/209 R, 225, 291, 307, 308, 312
See application file for complete search history.

(56) References Cited

U.S. PATENT DOCUMENTS

| 4,201,039 | A  | * | 5/1980  | Marion ...................... 368/241 |
| 4,734,619 | A  | * | 3/1988  | Havel ......................... 313/510 |
| 5,912,568 | A  |   | 6/1999  | Kiley et al. |
| 7,157,859 | B2 | * | 1/2007  | Inoue ......................... 315/185 R |
| 2005/0243022 | A1 | * | 11/2005 | Negru .......................... 345/46 |
| 2006/0250091 | A1 | * | 11/2006 | Ishida ........................... 315/86 |
| 2008/0164934 | A1 |   | 7/2008  | Hankey et al. |

FOREIGN PATENT DOCUMENTS

EP    1 615 195 A1    1/2006

* cited by examiner

*Primary Examiner* — Jimmy Vu
(74) *Attorney, Agent, or Firm* — Fletcher Yoder PC

(57) ABSTRACT

Systems and methods for multi-state switch networks and multi-state LED networks are provided. Systems and methods for maintaining the brightness of LEDs in multi-state LED networks are also provided. The multi-state networks contain control circuitry that can output a single control signal that is able to drive a pair of diodes in three different states. In a network of 2*N diodes, N wires are sufficient to drive the diodes in 3^N different states. The control circuitry may also include a pulse-width modulator that controls the perceived brightness of the LEDs in a multi-state LED network in response to a voltage level of the power source.

24 Claims, 8 Drawing Sheets

SYSTEMS AND METHODS FOR MULTI-STATE SWITCH NETWORKS

CROSS-REFERENCE TO RELATED APPLICATION

This application claims the benefit of U.S. Provisional Patent Application No. 60/878,852, filed Jan. 5, 2007 and U.S. Provisional Patent Application No. 60/937,853, filed Jun. 28, 2007, each of which are hereby incorporated by reference herein in its entirety.

BACKGROUND OF THE INVENTION

This relates to multi-state switch networks and more particularly to multi-state light-emitting diode (LED) network systems and methods. This also relates to systems and methods for maintaining the brightness of the LEDs within the multi-state LED network independent of battery voltage levels.

Typically, each switch within a switch network requires its own control signal. When these control signals are connected between multiple circuits and circuit boards, each control signal also requires its own I/O pin on each circuit board. The same is true for LED circuits, which typically require individual control signals and pins to operate each LED. As the number of control signals and pins increases, the size of the circuit also increases.

Accordingly, what is needed are systems and methods for multi-state switch networks and multi-state LED networks that require fewer control inputs and that reduces the space required for control signals and pins.

The brightness of an LED varies based on the supplied voltage. Therefore, in battery-powered LED systems, the brightness of the LED is reduced as the voltage of the battery declines.

Accordingly, what is needed is a multi-state LED network that maintains the brightness of the LEDs substantially independently of the supplied voltage.

SUMMARY OF THE INVENTION

Systems and methods for multi-state switch networks and multi-state LED networks are provided. Systems and methods for maintaining the brightness of LEDs in multi-state LED networks are also provided.

A multi-state switch network can control the states of two switches using only one control signal. In a multi-state LED network, two LEDs can be controlled using only one control signal. These multi-state networks contain control circuitry that is connected to a pair of serially connected diodes. In a switch network embodiment, the diodes can be connected to switches. In a LED network embodiment, the diodes are LEDs. The control circuitry outputs a single control signal that is able to drive the pair of diodes in three different states. In a network of N diode pairs, N wires are sufficient to drive the 2*N diodes of the N diode pairs in $3^N$ different states.

The control circuitry may also include a pulse-width modulator that controls the perceived brightness of the LEDs in a multi-state LED network. Pulse-width modulation can be used to vary the perceived brightness of an LED. A pulse-width modulated source connected to the LED can be used to turn the LED ON and OFF at a rate undetectable to the human eye. Increasing the amount of time the LED is turned OFF makes the LED appear dimmer while increasing the amount of time the LED is turned ON makes the LED appear brighter. Controlling the pulse-width modulation based at least in part on the battery voltage levels allows the control circuitry to maintain the brightness of the LEDs within the multi-state LED network substantially independently of supplied voltage.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE INVENTION

Commonly assigned U.S. patent application publication No. 2008-0164934, published Jul. 10, 2008, entitled "CONNECTORS DESIGNED FOR EASE OF USE" is hereby incorporated by reference in its entirety.

Figure 1:
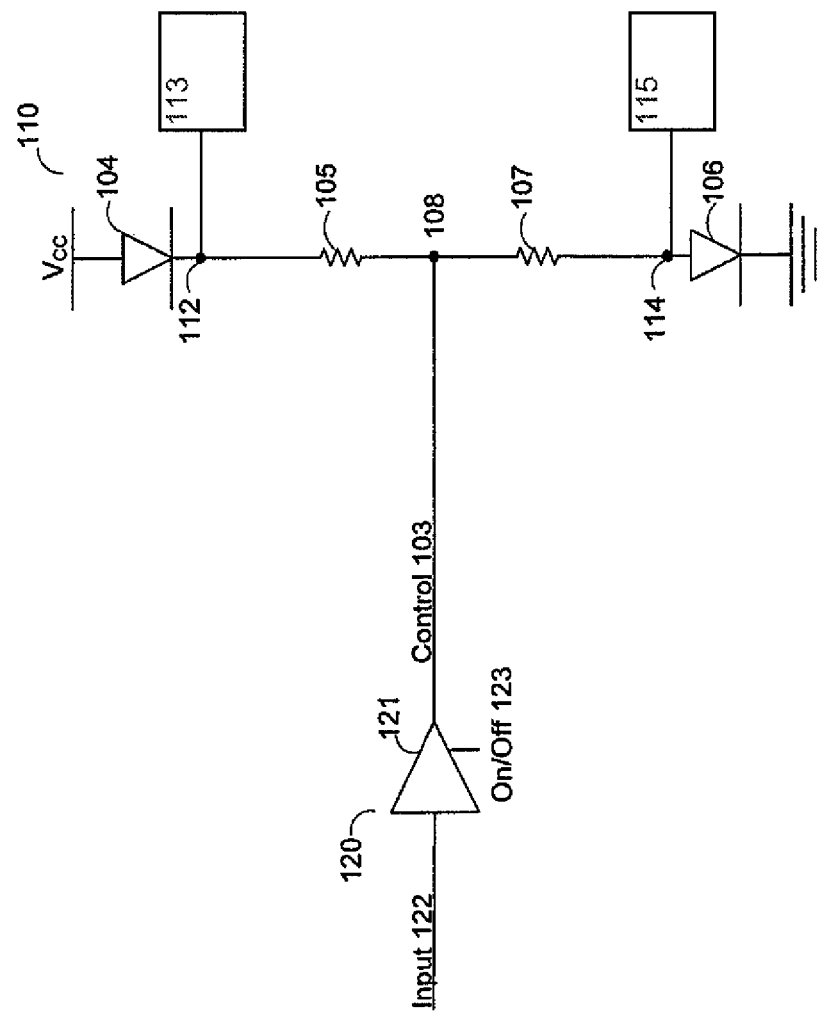
FIG. 1 shows a schematic diagram of illustrative multi-state switch network 100 in accordance with an embodiment of the present invention.

FIG. 1 shows a schematic diagram of illustrative multi-state switch network 100. Multi-state switch network 100 includes diode pair 110 and control circuitry 120. Control circuitry 120 controls the operation of diodes 104 and 106 within diode pair 110 using a single control signal 103.

In one embodiment, diodes 104 and 106 are light-emitting diodes (LEDs). An LED can be directly driven to turn ON and turn OFF. In another embodiment, diodes 104 and 106 are connected to switches and the diodes may be driven to turn those switches ON and OFF. For example, nodes 112 and 114 may be connected to any suitable switches (e.g., respective switches 113 and 115) including, for example, transistor switches, buffers, or any other logic circuits. For ease of explanation, in both embodiments the diodes will be referred to as being turned ON or OFF to indicate their states regardless of whether they are directly turned ON and OFF (e.g., an LED) or used to turn ON and OFF another device (e.g., a diode connected to a switch).

Diode pair 110 includes two diodes 104 and 106 connected in series between Vcc and ground. Diodes 104 and 106 can be of the same type or of different types. For example, diodes 104 and 106 can be different colored LEDs. Control signal 103, connected to control node 108, controls the state of diode pair 110. When a high voltage level control signal is applied to control node 108, diode 106 is turned ON and diode 104 is turned OFF. When a low voltage level control signal is applied to control node 108, diode 104 is turned ON and diode 106 is turned OFF. When no voltage is applied to control node 108, both diodes 104 and 106 can be turned OFF. When no voltage is applied to control node 108 by the control signal, control signal 103 is said to be in a high-impedance or HIGH-Z state. Thus, the two diodes of diode pair 110 may be operated in three different states using only a single control signal. These three states are illustrated in Table 1. The operation of diode pair 110 is illustrated in greater detail below with reference to the timing diagram of FIG. 4.

TABLE 1

Three States of Diode Pair 110

| Control 103 | Diode 104 | Diode 106 |
| --- | --- | --- |
| LOW-V | ON | OFF |
| HIGH-V | OFF | ON |
| HIGH-Z | OFF | OFF |

Diode pair 110 also includes resistors 105 and 107. The values of resistors 105 and 107 may be selected to provide appropriate bias voltage levels to diodes 104 and 106. When properly biased, the voltage across each of the diodes may be approximately equal to the threshold voltages of the diodes when the diodes are supposed to be turned ON and the voltage across each of the diodes may be below the threshold voltage of the diodes when the diodes are supposed to be turned OFF. Different types of diodes have different threshold voltage levels, which may affect the selection of resistors 105 and 107. Thus, the values of resistors 105 and 107 may be selected based on the voltage levels of the system and the properties of diodes 104 and 106.

Control circuitry 120 can be used to generate control signal 103 that is used to control diode pair 110. Control circuitry 120 can include tri-state buffer 121. Tri-state buffer 121 receives input signal 122 and ON/OFF signal 123 and outputs control signal 103. ON/OFF signal 123 can be used to switch diodes 104 and 106 of diode pair 110 ON and OFF. When ON/OFF signal 123 is ON, input signal 103 can be used to select which one of diodes 104 and 106 is turned ON. Additional circuitry that generates signals 122 and 123 can also be included within control circuitry 120 or can be received from another circuit.

Figure 2:
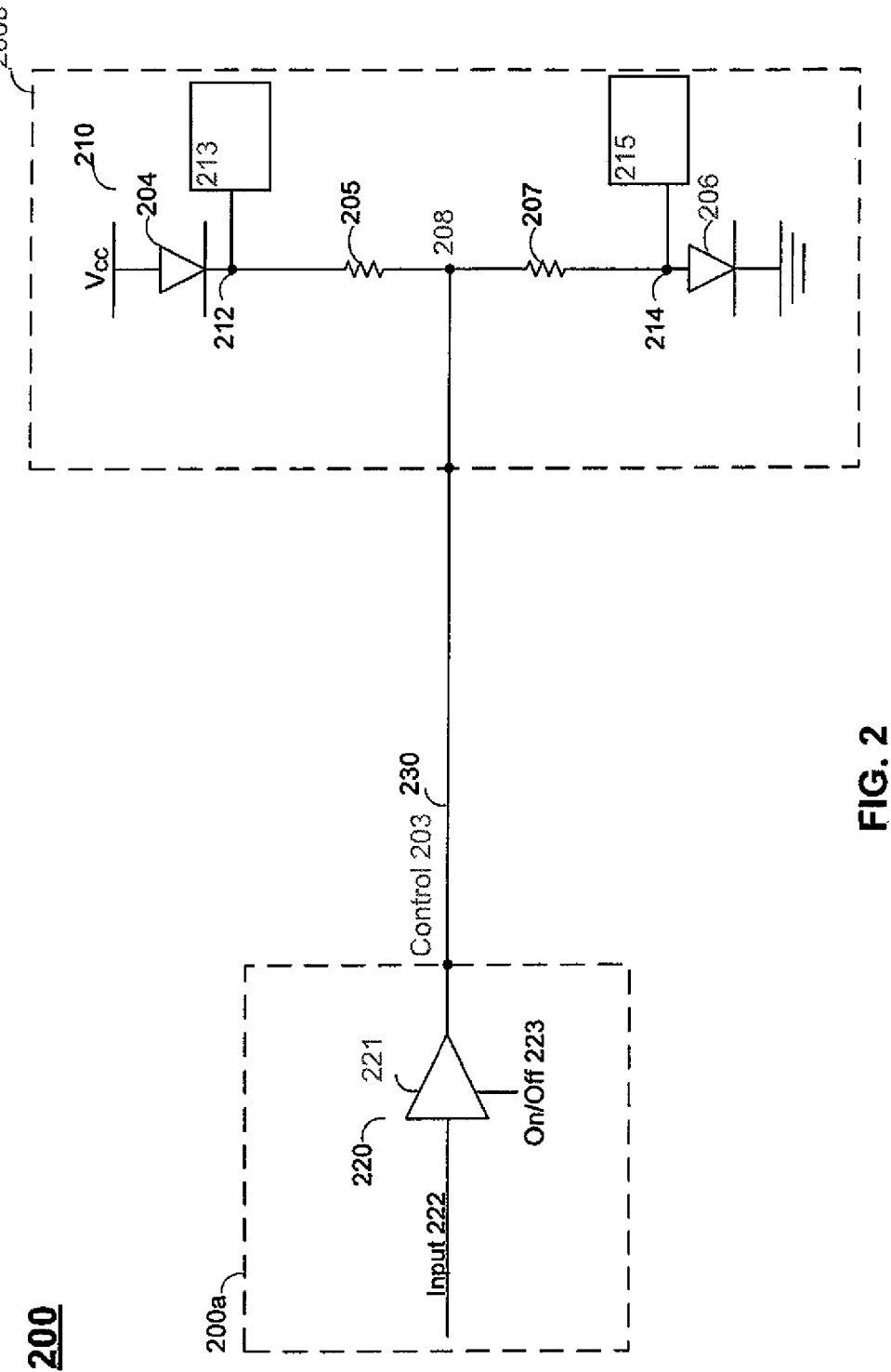
FIG. 2 shows a schematic diagram of illustrative multi-state switch network 200 implemented in separate circuits in accordance with an embodiment of the present invention.

Diode pair 110 and control circuitry 120 can be connected together within the same circuits as shown in FIG. 1 or may be located in separate circuits as shown in FIG. 2. FIG. 2 shows control circuitry 220 implemented in a first circuit 200a and LED pair 210 implemented in a second circuit 200b. Circuits 200a and 200b are connected using any suitable wire or connector 230. For example, connector 230 may be used to connect the first circuit 200a and the second circuit 200b implemented on flexible printed circuit boards. Diode pair 210 and control circuitry 220 can be the same or substantially similar to their counterparts in multi-state switch network 100. For example, as shown in FIG. 2, control circuitry 220 may control the operation of diodes 204 and 206 within diode pair 210 using a single control signal 203. Diodes 204 and 206 can be connected in series between Vcc and ground, and control signal 203 can be connected to control node 208. Diode pair 210 can also include resistors 205 and 207. Nodes 212 and 214 may be coupled to any suitable switches (e.g., respective switches 213 and 215). Control circuitry 220 can include tri-state buffer 121 that may receive input signal 222 and ON/OFF signal 223.

Figure 3:
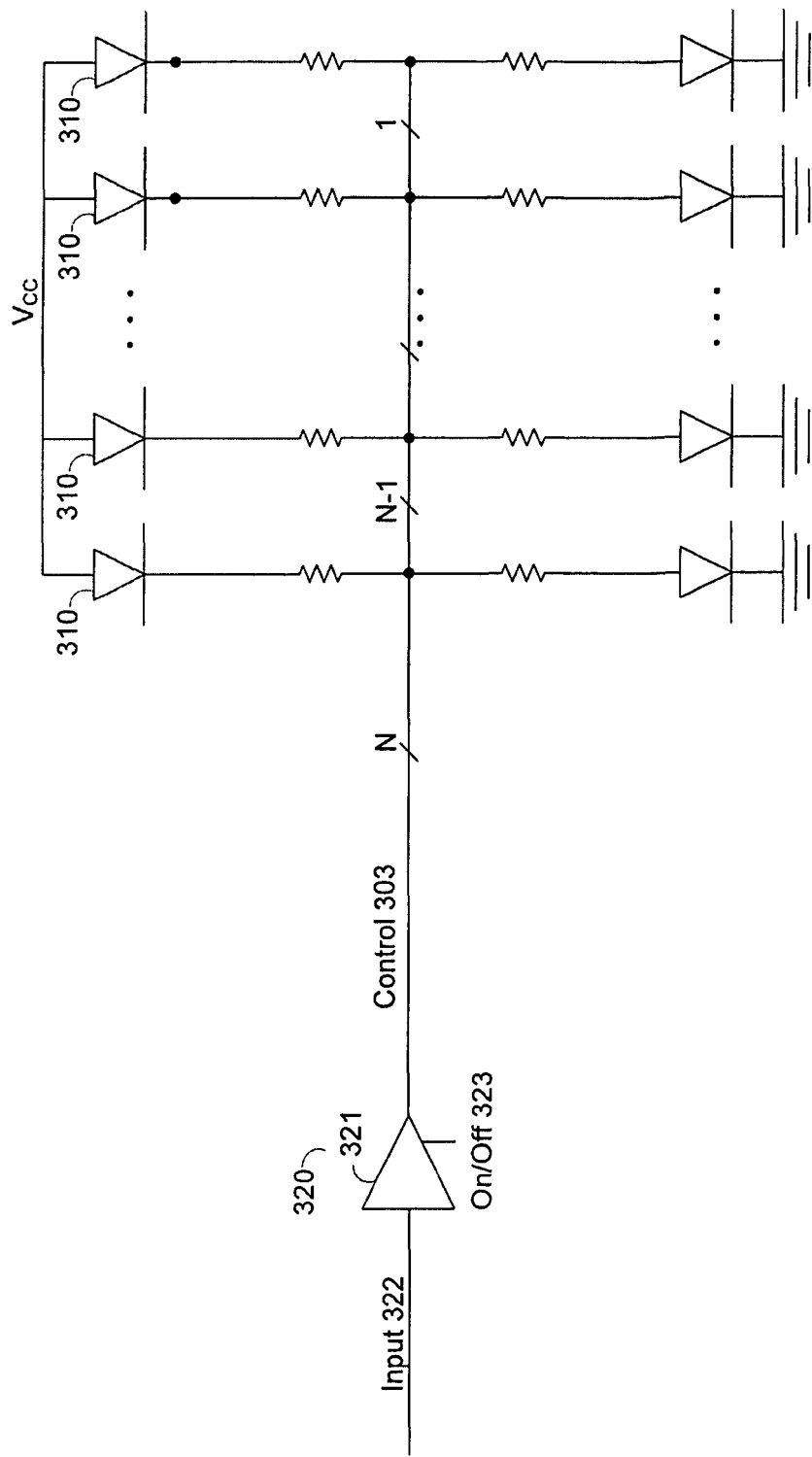
FIG. 3 shows a schematic diagram of illustrative multi-state switch network 300 having N diode pairs in accordance with an embodiment of the present invention.

FIG. 3 shows a network of N diode pairs 310 connected to control circuit 320. Diode pairs 310 and control circuit 320 are the same or substantially similar to their counterparts in multi-state switch network 100. In this arrangement, the 2*N diodes of the N diode pairs 310 can be controlled using only N control signals 303 that are output from control circuit 320. Control circuit 320 can have a drive strength approximately N times the drive strength of control circuit 120 (FIG. 1) in order to drive the N control signals 303. As described above with respect to multi-state switch network 100, each of the N diode pairs 310 can be driven to three different states using only one control wire. Thus, it can be seen that the 2*N diodes of the N diode pairs 310 can be driven to $3^N$ different states using only N wires. Thus, the number of wires and connectors that are required to control a plurality of LEDs or switches may be reduced.

Figure 4:
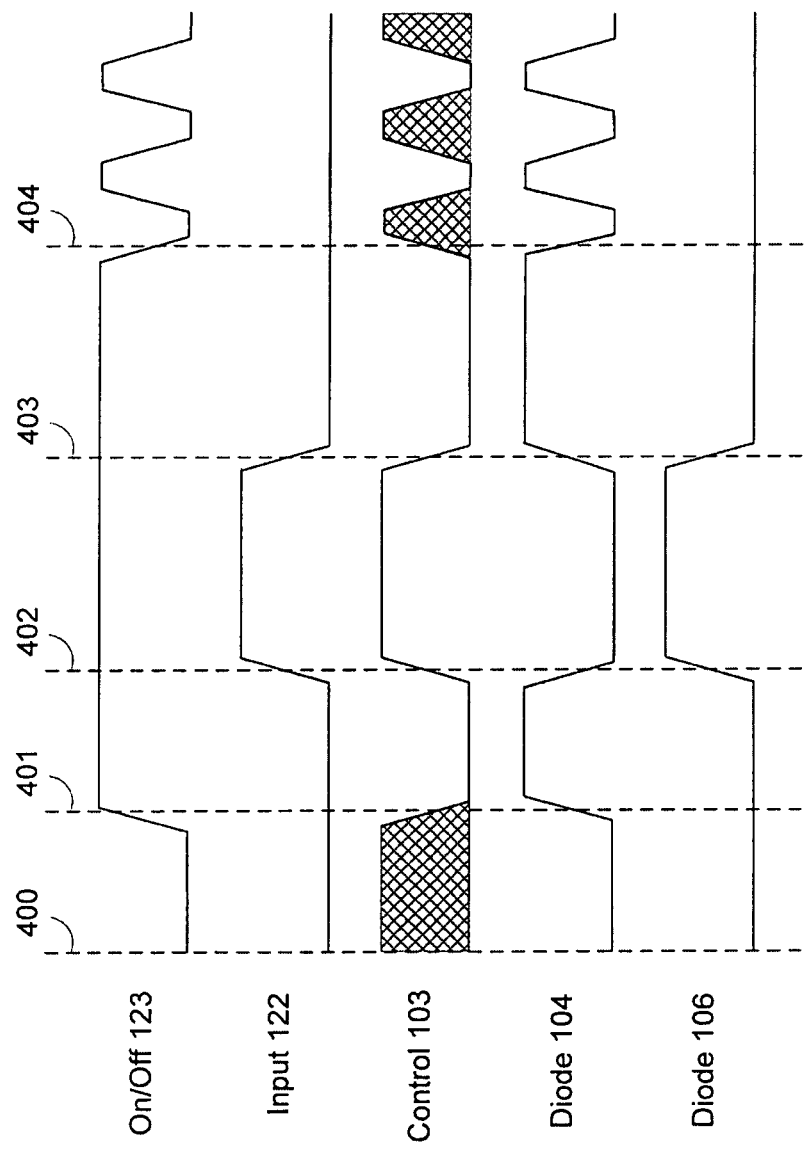
FIG. 4 shows a timing diagram that illustrates the operation of multi-state switch network 100 in accordance with an embodiment of the present invention.

FIG. 4 shows a timing diagram 400 which illustrates the operation of multi-state switch network 100. At time 400, ON/OFF signal 123 is at a low voltage level. Thus, tri-state buffer 121 (FIG. 1) is turned OFF, control signal 103 is in a high-impedance state, and both diodes 104 and 106 are turned OFF. At time 401, ON/OFF signal 123 is switched to a high voltage level, turning ON tri-state buffer 121. Input signal 122 is at a low voltage level and therefore control signal 103 is also at a low voltage level. In response to the transition of control signal 103 from a high-impedance state to a low voltage level, diode 104 is turned ON and diode 106 remains OFF. At time 402, input signal 122 is driven to a high voltage level, which switches control signal 103 to a high voltage level. In response to this transition, diode 104 turns OFF and diode 106 turns ON. At time 403, input signal 122 is brought to a low voltage level, therefore control signal 103 is also brought to a low voltage level. In response, diode 104 turns ON and diode 106 turns OFF. Finally, after time 404, ON/OFF signal 123 is cycled between a high voltage level and a low voltage level, which causes output signal 103 to cycle between a low voltage level and a high-impedance state. As a result, diode 104 is cycled ON and OFF. Diode 106 remains turned OFF for this entire period.

When used in a battery-powered system, the perceived luminous intensity or brightness of an LED may decrease as battery voltage level decreases. However, if the brightness of an LED can be adjusted, the brightness of the LED can be increased as the battery voltage decreases in order to keep the brightness level of the LED substantially constant.

Figure 5:
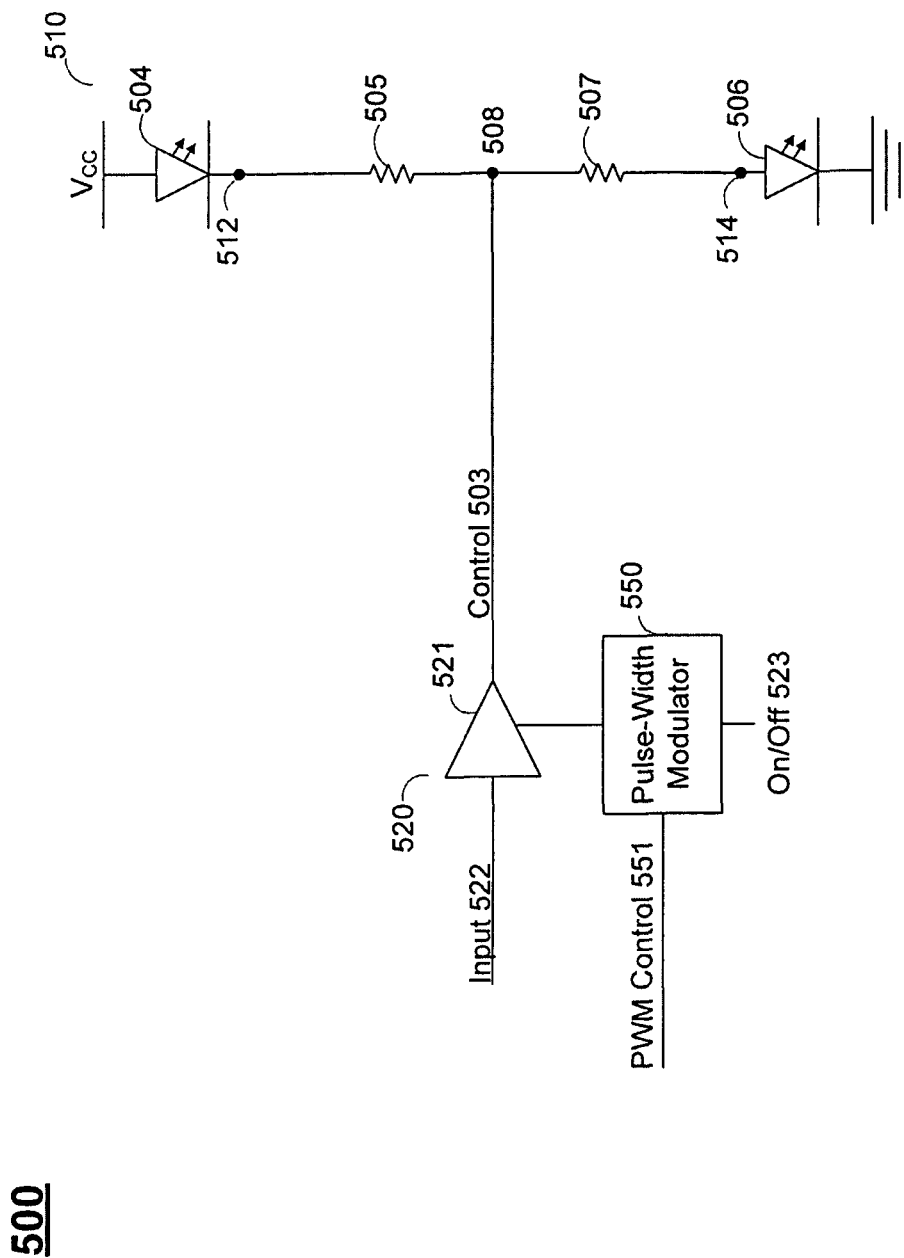
FIG. 5 shows a schematic diagram of an illustrative multi-state LED network 500 with a pulse-width modulator in accordance with an embodiment of the present invention.

FIG. 5 shows a schematic diagram of an illustrative multi-state LED network 500 with a pulse-width modulator 550 that is adjustable to control the perceived brightness of the LEDs. Multi-state switch network 500 includes diode pair 510 and control circuitry 520, which are the same or substantially similar to their counterparts in multi-state switch network 100. Diode pair 510 contains two LEDs 504 and 506.

Pulse-width modulator 550 can be used to control the perceived brightness of LEDs 504 and 506. Whenever LEDs 504 or 506 are turned ON, pulse-width modulator 550 causes tri-state buffer 521 to generate a control signal 503 that provides diode pair 510 with a series of discrete pulses instead of a continuous high or low voltage signal. As a result, LEDs 504 and 506 are rapidly pulsed ON and OFF rather than being ON continuously. When the pulse rate is sufficiently quick, the human eye is unable to detect the pulsing and will instead see the LED as continuously ON.

Duty cycle is a measure of the ratio of the duration of a particular phenomenon in a given period to the duration of the period. In this instance, the phenomenon is the duration that the LED is turned ON. Thus, when the LED is continuously turned ON it has a duty cycle of 1 or 100%. Varying the duty cycle of ON/OFF signal 523, which varies the duty cycle of control signal 503, controls the duty cycle of the LED and therefore the perceived brightness of the LED. Reducing the duty cycle of the LED reduces the perceived brightness of the LED, while increasing the duty cycle of the LED increases the perceived brightness of the LED.

Figure 6A:
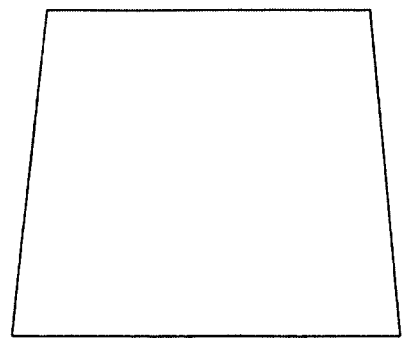
FIG. 6A shows a continuous signal with a 100% duty cycle that may be used to drive multi-state LED network 500 in accordance with an embodiment of the present invention.
Figure 6B:
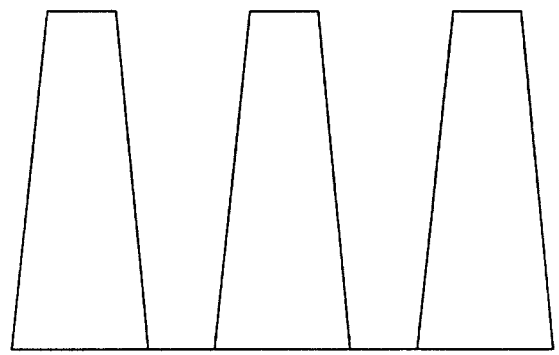
FIG. 6B shows a continuous signal with a 66% duty cycle that may be used to drive multi-state LED network 500 in accordance with an embodiment of the present invention.
Figure 6C:
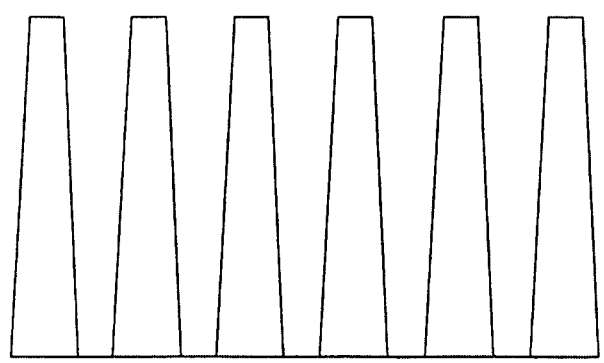
FIG. 6C shows a continuous signal with a 50% duty cycle that may be used to drive multi-state LED network 500 in accordance with an embodiment of the present invention.

FIG. 6A shows a continuous high voltage signal, i.e., a high voltage signal with a 100% duty cycle. FIG. 6B shows the same high voltage signal of FIG. 6A with a 66% duty cycle and FIG. 6C shows the same signal with a 50% duty cycle. The signal with the highest duty cycle (i.e., FIG. 6A), when applied to control circuitry 520, may cause LED 506 to appear brighter than when the signals with lower duty cycles are applied (i.e., FIGS. 6B and 6C). The signal of FIG. 6C may cause the lowest perceived brightness of the three signals.

Pulse-width modulator 550 has a modulation control input 551 that can be used to vary the duty cycle of the output of pulse-width modulator 550 in order to control the perceived brightness of LEDs 504 and 506. PWM control input 551 can receive a signal from a battery voltage level monitor (not shown) that is indicative of the charge of the battery. The battery voltage monitor can include, for example, an analog to digital converter (ADC), a comparator with adjustable thresholds, or multiple comparators with set thresholds, or any other suitable circuitry. When the battery is fully charged, pulse-width modulator 550 may be set to provide the LEDs with a decreased perceived brightness level. Then as the battery voltage level decreases, PWM control input 551 can control pulse-width modulator 550 to increase the perceived brightness levels of the LEDs to compensate for the diminished voltage provided to the LEDs.

For example, a signal with a 50% duty cycle may cause the LEDs to provide sufficient perceived brightness when the battery is at a fully charged voltage level, but as the battery weakens the duty cycle may be increased to 75% to increase the perceived brightness of the LEDs. Thus, by increasing the perceived brightness of the LEDs as the battery voltage level decreases, the perceived brightness of the LED may be maintained at a substantially constant level independent of the voltage level of the battery.

Figure 7:
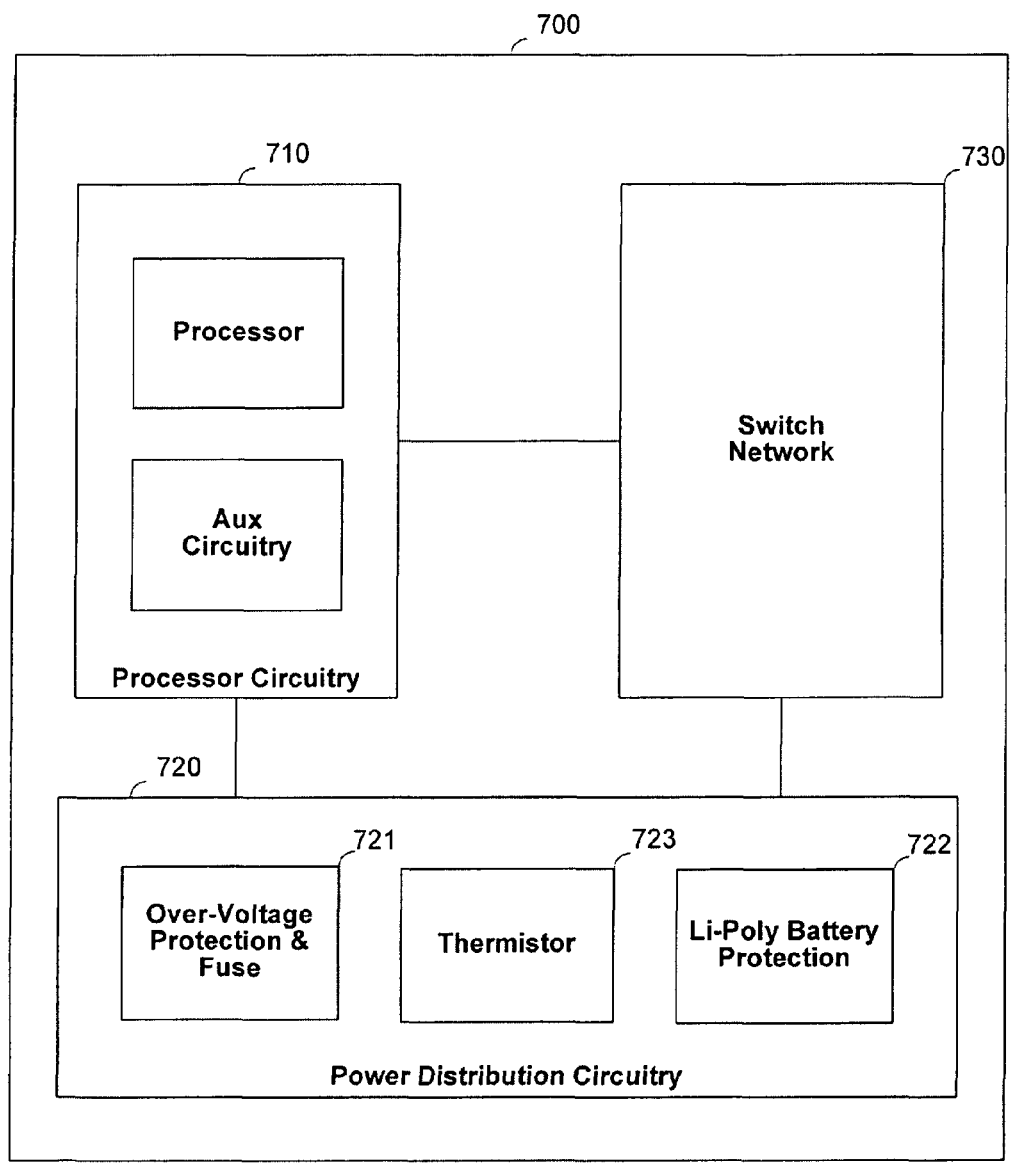
FIG. 7 is a simplified block diagram of a system that incorporates a multi-state switch network in accordance with an embodiment of the present invention.

FIG. 7 shows a simplified block diagram of a system that incorporates a multi-state switch network. System 700 includes processor circuitry 710, power distribution circuitry 720, and switch network circuitry 730. Processor circuitry 710 can include a processor and auxiliary circuitry that works with the processor. Processor circuitry 710 can coordinate all of the operations in system 700, including, for example, controlling power distribution circuitry 720 and switch network 730. In some embodiments, processor circuitry 710 may include control circuitry (e.g., control circuitry 120 of FIG. 1) that may provide control signals to switch network 730. Switch network 730 may include one or more diode or LED pairs, each controlled by a single control signal.

Power distribution circuitry 720 can include over-voltage protection and fuse 721, li-poly battery protection 722 and thermistor 723. Over-voltage protection and fuse 721 can protect system 700 in the event that an unsafe amount of voltage is applied to one or more inputs. The fuse in the protection circuitry can be any over-current protection device which disconnects the circuit it is coupled with if an over-current condition is present. Li-Poly battery protection circuitry 722, can include circuitry to prevent the malfunction of a li-poly battery which could result in a dangerous overheating situation. Li-poly battery protection circuitry 722 is typically built into battery packs as integrated protection circuitry. In accordance with the present invention, this circuitry can be separated from the battery and located anywhere within system 700. Thermistor 723 can be located in the proximity of a battery (not shown) so that the resistance of the thermistor is indicative of the battery's temperature. One or more inputs of processor circuitry 710 can be electrically coupled with thermistor 723 so that the processor can monitor the temperature of the battery. Processor 710 can be programmed to charge the battery differently depending on the temperature of the battery. For example, processor 710 can vary the battery charging current according to the detected temperature. In order to extend the life of a battery, it is beneficial to charge the battery only when it is within a certain temperature range. By regulating the charging in this manner, one can extend the life of a battery beyond what would typically be expected. Power distribution circuitry 720 can also monitor the charge level of the battery and provide this information to switch network 730 in order to adjust the perceived brightness of any LEDs located within switch network 730. This battery charge level information can be provided directly from power distribution circuitry 720 to switch network 730 or may be provided by way of processor circuitry 710.

A detailed description of the design and function of exemplary systems that can incorporate circuits similar to switch network 730 can be found in U.S. patent application publication No. 2008-0164934, entitled "CONNECTORS DESIGNED FOR EASE OF USE," which is incorporated herein.

Figure 8:
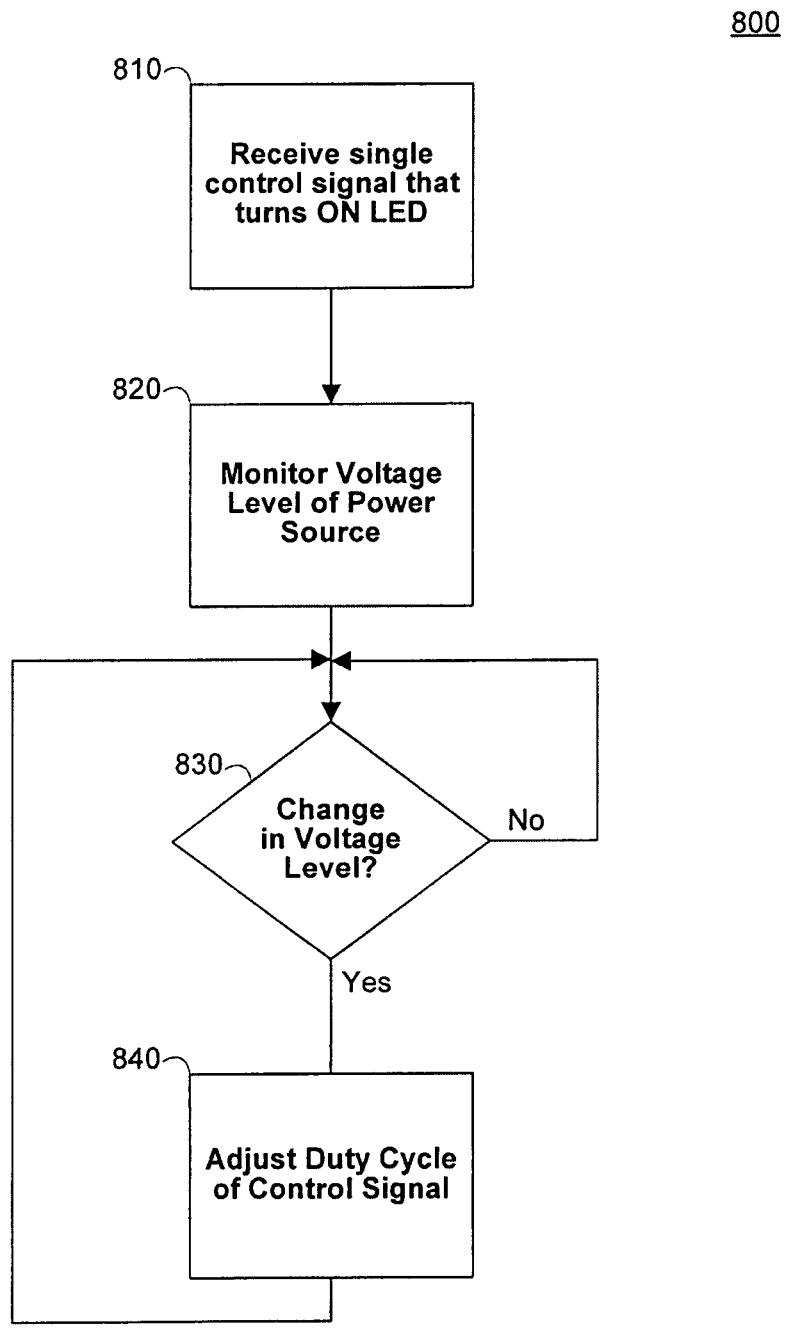
FIG. 8 is a flowchart of an illustrative process in accordance with an embodiment of the present invention.

FIG. 8 shows a flowchart of process 800 for adjusting the perceived brightness of an LED within a multi-state LED network in accordance with the present invention. At step 810, a diode pair receives a control signal that turns ON an LED in a diode pair. For example, in LED network 500 of FIG. 5, diode pair 510 may receive a high voltage level control signal 503 that turns ON LED 506. At step 820, the voltage level of a power source, such as a battery, can be monitored until there is a change in the voltage level at step 830. If there is a change in the voltage level, at step 840 the duty cycle of the control signal can be adjusted. For example, with reference to LED network 500 of FIG. 5, if the voltage level decreases, PWM control signal 551 can be adjusted which may cause pulse-width modulator 550 to increase the duty cycle of control signal 503. This increase in the duty cycle of control signal 503 may increase the perceived brightness of LED 506, which may offset any decrease in the perceived brightness caused by any reduction in the voltage level.

Thus it is seen that the systems and methods for multi-state switch networks are provided. Those skilled in the art will appreciate that the invention can be practiced by other than the described embodiments, which are presented for purposes of illustration rather than of limitation, and the invention is limited only by the claims which follow.

What is claimed is:
1. A multi-state switch network comprising:
a serially-connected diode pair that receives a single control signal at a control node;
wherein the single control signal is operative to drive the serially-connected diode pair to one of at least three different states; and wherein the single control signal is operative to alternatively:
turn ON a first diode of the diode pair and turn OFF a second diode of the diode pair when the single control signal is in a first state;
turn OFF the first diode and turn ON the second diode when the single control signal is in a second state; and
turn OFF the first diode and turn OFF the second diode when the single control signal is in a third state, wherein the third state comprises a high impedance state.

2. The multi-state switch network of claim 1, wherein the serially-connected diode pair comprises a pair of LEDs.

3. The multi-state switch network of claim 2, comprising a pulse-width modulator that modulates the single control signal to control a perceived brightness level of the pair of LEDs.

4. The multi-state switch network of claim 3, wherein the pulse-width modulator is operative to adjust a duty cycle of the single control signal based on a monitored voltage level.

5. The multi-state switch network of claim 4, wherein the pulse-width modulator is operative to increase the duty cycle of the single control signal based on a decrease in the monitored voltage level.

6. The multi-state switch network of claim 4, wherein the pulse-width modulator is operative to decrease the duty cycle of the single control signal based on an increase in the monitored voltage level.

7. The multi-state switch network of claim 1, wherein the serially-connected diode pair is operative to control a pair of switches.

8. The multi-state switch network of claim 1, wherein:
the first state comprises a higher voltage state; and
the second state comprises lower voltage state.

9. The multi-state switch network of claim 1, wherein the serially-connected diode pair consists essentially of two diodes and two resistors in serial communication.

10. The multi-state switch network of claim 1, comprising a tri-state buffer that provides the control signal.

11. A plurality of serially-connected diode pairs as defined in claim 1, each of the serially-connected diode pairs controlled by a single control signal.

12. The multi-state switch network of claim 1, wherein the second state comprises a high voltage state.

13. The multi-state switch network of claim 1, wherein the first state comprises a low voltage state.

14. The multi-state switch network of claim 1, comprising:
a power source;
a ground source; and
a control node, wherein:
a first diode of the diode pair is serially coupled between the power source and the control node;
a second diode of the diode pair is serially coupled between the control node and the ground source; and
the diode pair receives the single control signal at the control node.

15. The multi-state switch network of claim 14, comprising:
a first resistor; and
a second resistor, wherein:
the first resistor is serially coupled between the first diode and the control node; and
the second resistor is serially coupled between the second diode and the control node.

16. The multi-state switch network of claim 14, comprising a first switch node serially coupled between the first diode and the control node.

17. The multi-state switch network of claim 16, comprising a first switch coupled to the first switch node.

18. The multi-state switch network of claim 17, wherein the first switch comprises one of a transistor switch, a buffer, and a logic circuit.

19. The multi-state switch network of claim 17, comprising:
a second switch node serially coupled between the second diode and the control node; and
a second switch coupled to the first switch node.

20. A method of controlling a multi-state switch network comprising first and second diodes, the method comprising:
receiving a single control signal at a control node;
in response to the single control signal, alternatively:
turning ON the first diode and turning OFF the second diode when the single control signal is in a first state;
turning OFF the first diode and turning ON the second diode when the single control signal is in a second state; and
turning OFF the first diode and turning OFF the second diode when the single control signal is in a third state, wherein the third state comprises a high impedance state.

21. The method of claim 20, wherein the first diode and the second diode are LEDs.

22. The method of claim 21, comprising pulse-width modulating the single control signal to control a perceived brightness level of the LEDs.

23. The method of claim 22, comprising:
monitoring a voltage level of a power source; and
adjusting a duty cycle of the control signal based on the monitored voltage level.

24. The method of claim 20, comprising:
switching a first switch in response to turning ON the first diode; and
switching a second switch in response to turning ON the second diode.

* * * * *